(12) United States Patent
Kujawa (10) Patent No.: US 7,219,464 B1
(45) Date of Patent: May 22, 2007

(54) LOCKING STORAGE SYSTEMS FOR FISHING RODS

(76) Inventor: John Kujawa, 1011 Bay St., Delray Beach, FL (US) 33483

( * ) Notice: Subject to any disclaimer, the term of this patent is extended or adjusted under 35 U.S.C. 154(b) by 0 days.

(21) Appl. No.: 11/256,512

(22) Filed: Oct. 21, 2005

(51) Int. Cl.
*A01K 97/10* (2006.01)

(52) U.S. Cl. .......................... 43/21.2; 70/58; 211/70.8; 211/8; 224/922

(58) Field of Classification Search .............. 43/21.2; 211/70.8, 8, 9, 7, 4; 224/922; 70/57, 57.1, 70/58, 59, 61, 62
See application file for complete search history.

(56) References Cited

U.S. PATENT DOCUMENTS

| | | | | | |
|---|---|---|---|---|---|
| 438,735 | A | * | 10/1890 | Miller et al. | 211/8 |
| 1,204,813 | A | * | 11/1916 | Murray | 211/8 |
| 1,221,584 | A | * | 4/1917 | Patrick | 211/8 |
| 1,291,430 | A | * | 1/1919 | Davenport | 211/8 |
| 2,119,217 | A | * | 5/1938 | Pompeo | 70/61 |
| 2,580,625 | A | * | 1/1952 | Waltz | 43/21.2 |
| 2,797,851 | A | * | 7/1957 | Leake | 224/922 |
| 2,798,369 | A | * | 7/1957 | Homan | 70/58 |
| 2,855,108 | A | * | 10/1958 | Haapala | 211/64 |
| 2,858,690 | A | * | 11/1958 | Sanderson et al. | 70/58 |
| 2,907,506 | A | * | 10/1959 | Sammons | 224/922 |
| 2,953,251 | A | * | 9/1960 | Selden et al. | 211/4 |
| 2,958,422 | A | * | 11/1960 | Caloiero et al. | 211/4 |
| 3,204,362 | A | * | 9/1965 | Andrews | 211/7 |
| 3,635,433 | A | * | 1/1972 | Anderson | 211/70.8 |
| 3,876,076 | A | * | 4/1975 | Hazelhurst | 211/70.8 |
| 4,027,798 | A | * | 6/1977 | Swaim | 211/70.8 |
| 4,047,686 | A | * | 9/1977 | Porter | 70/58 |
| 4,063,646 | A | * | 12/1977 | Stahl, Jr. | 211/70.8 |
| 4,113,107 | A | * | 9/1978 | Jaeger | 211/4 |
| 4,132,315 | A | * | 1/1979 | Young | 211/4 |
| 4,523,704 | A | * | 6/1985 | Washington | 224/922 |
| 4,572,416 | A | * | 2/1986 | Upham | 224/922 |
| 4,871,099 | A | * | 10/1989 | Bogar, Jr. | 43/21.2 |
| 4,897,952 | A | * | 2/1990 | Hawie | 43/21.2 |
| 4,961,505 | A | * | 10/1990 | Moeller | 211/70.8 |
| 4,986,427 | A | * | 1/1991 | Law et al. | 211/70.8 |
| 5,361,611 | A | * | 11/1994 | Hisler | 211/4 |
| 5,435,473 | A | * | 7/1995 | Larkum | 211/70.8 |
| 5,460,306 | A | * | 10/1995 | Rudd | 43/21.2 |
| 5,520,291 | A | * | 5/1996 | Graham | 211/4 |
| 5,524,753 | A | * | 6/1996 | Murphy | 211/70.2 |
| 5,588,542 | A | * | 12/1996 | Winkler et al. | 211/70.8 |
| 5,632,427 | A | * | 5/1997 | Gattuso et al. | 43/21.2 |
| 5,715,952 | A | * | 2/1998 | Chichetti | 211/70.8 |
| 6,499,248 | B2 | * | 12/2002 | Thompson | 43/21.2 |

(Continued)

*Primary Examiner*—Darren W. Ark
(74) *Attorney, Agent, or Firm*—John C. Smith (57) ABSTRACT

A locking storage system for fishing rods includes a retention base, a sliding lock plate and a plurality of rod collars. A plurality of openings are formed through the retention base. A rod collar is inserted through the openings. The rod collar is sized to receive the end of a fishing rod. The sliding lock plate captures the reel pedestal of a reel of a fishing rod. The sliding lock plate is secured to the retention base with a padlock. A rod retention plate may be used in conjunction with the locking storage system for fishing rods. A second embodiment includes a contoured rod base and a sliding lock plate engaged with the contoured rod base. A third embodiment includes a rod tray, a rod support and a swinging lock plate.

5 Claims, 12 Drawing Sheets

U.S. PATENT DOCUMENTS 6,510,953 B2 * 1/2003 Daniels .................... 211/70.8
6,530,170 B1 * 3/2003 Sweeney .................... 43/21.2
6,910,592 B1 * 6/2005 Lindenmeyer ............. 211/70.8
6,932,224 B1 * 8/2005 Sandberg .................... 211/70.8
2005/0126063 A1 * 6/2005 Bowerman .................. 43/21.2

* cited by examiner

LOCKING STORAGE SYSTEMS FOR FISHING RODS

CROSS-REFERENCE TO RELATED APPLICATION

This application claims the benefit of now abandoned U.S. Provisional Patent Application Ser. No. 60/618,842, filed Oct. 14, 2004, which is incorporated herein in its entirety.

BACKGROUND OF THE INVENTION

1. Field of the Invention

The present invention relates generally to fishing rods and more particularly, to locking storage systems for fishing rods, which allow a plurality of fishing rods to be stored and locked on a vessel or the like, when not in use.

2. Description of the Prior Art

Avid anglers engaging in some types of fishing may utilize 4, 6, or more expensive fishing rods in the course of a fishing day. Because these rods are somewhat cumbersome they are often left unattended, for example in the cockpit of a vessel. Not surprisingly, it is not at all uncommon for these rods to be stolen off a boat while the vessel is docked overnight at a marina, left unattended at a fuel dock, or even when stopped at a traffic light while the boat is being pulled. Similarly, rods being transported in a vehicle or stored in a garage are also targets of thieves. In short, any time fishing rods are left unattended and unsecured the potential for theft exists. While several locking mechanisms for fishing rods exist, these either lock only the actual fishing rod (and not the reel) or require a cumbersome box to encase all or part of the rod/reel combination. Moreover, many of the existing designs do not allow for quick, unencumbered access to fishing gear when locking attributes are not required, and do not offer effective duality of use for storing related boating or fishing items such as gaffs, boat brushes, or boat hooks.

Vertically supported tubular rod holders with downward slots, which accommodate reel stems, such as that described in U.S. Pat. No. 4,871,099 are very common. This type of holder is inexpensive, typically manufactured to be suitable for a marine environment, offers flexible mounting options, and allows the fisherman to utilize the rack both for storage/transport and while he/she is actively fishing. However, this holder offers no security against theft.

Simple 'rod type' locking mechanisms, such as the truck bumper-mounted unit described in U.S. Pat. No. 5,435,473 provide a simple solution to the prevention of theft, however designs requiring full removal of the locking rod preclude installation on many of the available mounting surfaces of a boat (such as under a gunwale with an overhang, or on the inner surface of a narrow transom). This is because there must be an unobstructed area on one side of the unit equal to the locking-rod length to allow full removal of the locking rod. Moreover, such a design exposes a significant portion of the locking rod, inviting would-be thieves to simply cut the rod and remove the fishing rod and reel combinations. Finally, such locking devices are limited in their ability to lock reels other than spinning reels (e.g. conventional reels or fly reels) because these types of reels do not have a reel stem which sets the main body of the reel off from the fishing rod.

Enclosed designs, such as those described in U.S. Pat. Nos. 6,499,248 B2 and 4,572,416 are typically intended for automobile roof top transport of rods and are not suitable for boats because they require an inordinate amount of space. Perhaps more importantly, the unit obviously cannot be used to hold rods that need to be quickly and easily accessed, such as while fishing.

Semi-enclosed designs, such as that described in U.S. Pat. No. 6,530,170 may offer some protection from theft and relative ease of access, however this ease of access can be enjoyed only when the somewhat cumbersome cover is removed, requiring significant storage space somewhere on the boat. In addition, this design is limited with respect to the breadth of reel sizes that it can accommodate. Because the locking cover must be designed and permanently installed to accommodate the largest fishing rod/reel(s). However, smaller rod/reel combinations may not be enclosed snugly enough to prevent their disassembly and subsequent removal from the rack.

Similarly, such limitations deem these designs ill-suited for storing related boating accessories such as gaffs, boat brushes, and boat hooks. Such semi-enclosed or enclosed designs often require a user to relieve tension on the fishing line on a Rod/Reel Combination stored in the unit so that the enclosure can properly conceal the Rod/Reel Combinations, inviting the opportunity for tangles and dangerous dangling tackle. Moreover, this design requires more installation space as there are (2) independent units, which must installed. Finally, the specific design cited requires the use of 2 separate padlocks to secure the rods, reducing convenience.

Single-fishing rod locking devices, such as those described in U.S. Pat. Nos. 5,460,306 and 5,361,611 appear to provide some security and possible ease of access. However such designs obviously provide storage for only a single fishing rod. Storing multiple fishing rods would obviously require multiple padlocks, multiple mountings, etc, thus greatly increasing complexity of both installation and use.

Accordingly, there is an established need for locking storage systems for fishing rods, which may be locked to prevent unauthorized removal of the fishing rods (rod/reel units), when they are left unattended, but which provides convenient access to gear when the rack is not locked.

SUMMARY OF THE INVENTION

The invention is directed to locking storage systems for fishing rods, which may be mounted anywhere fishing rods are used, transported, or stored, such as a vessel, an automobile, or a home.

In one general aspect of the present invention, the locking storage system for fishing rods includes a retention base with a plurality of openings that are sized to retain a plurality of rod collars. Each rod collar is sized to receive a rod of a fishing rod. A sliding lock plate is used to lock the plurality of fishing rods relative to the retention base.

In another aspect of the present invention, the locking storage system for fishing rods includes a rod retention plate with a plurality of notches sized to retain a plurality of fishing rods and an elastic cord for retaining the plurality of fishing rods in the plurality of notches.

In a further aspect of the present invention, the locking storage system for fishing rods includes a contoured rod base that is sized to retain at least two fishing rods and a sliding lock plate to lock the plurality of fishing rods in the contoured rod base.

In yet a further aspect of the present invention, the locking storage system for fishing rods includes a rod tray that is sized to retain at least two fishing rods with a swinging lock plate.

These and other aspects, features, and advantages of the present invention will become more readily apparent from the attached drawing and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION OF THE PREFERRED EMBODIMENTS

Shown throughout the figures, the present invention is generally directed to a locking storage system for fishing rods 1. Referring briefly to FIGS. 1–5, the locking storage system for fishing rods 1 preferably includes a retention base 10, a sliding lock plate 12 and a plurality of rod collars 14. The retention base 10 is preferably fabricated from a square tube although it should be appreciated by those skilled in the art that any of a wide variety of other shapes and configurations may be utilized without departing from the present invention. A plurality of reel clearance openings 16 are formed through a top and side of the retention base 10 wherein the reel clearance openings 16 have horizontally extending portions 16a in the top of the retention base and vertically extending portions 16b in the side of the retention base. A plurality of rod clearance openings 18 are formed through a bottom of the retention base 10 in-line with the plurality of reel clearance openings 16. Each reel clearance opening 16 and each rod clearance opening 18 are sized to receive a single rod collar 14. The rod collar 14 preferably includes a flared end 20, a bottom end 21, and a reel clearance slot 22 formed through the flared end 20 and extending toward the bottom end 21 and terminating at a location above the bottom end 21. The flared end 20 also having portions resting on the top of the retention base 10. The reel clearance slot 22 both communicating in a horizontal direction with and being aligned with a respective vertically extending portion of the plurality of openings. The inner perimeter of the rod collar 14 is sized to receive a rod end 102 of a fishing rod 100.

The sliding lock plate 12 includes a plurality of locking projections 26 that extend from a lock base 24. A locking tab 28 extends from one of the locking projections 26. A tab slot 30 is formed adjacent one of the reel clearance openings 16 to receive the locking tab 28. The sliding lock plate 12 is slid from a locked position to an unlocked position with the tab slot 28. A mounting pedestal 106 of a spinning reel 104 is captured between a single locking projection and a bottom of the reel clearance opening 16. The fishing rods 100 cannot be removed from the retention base 10, when the sliding lock plate 12 is in a locked position. A plate-locking hole 32 is formed through one end of the lock base 24. A tube-locking hole 34 is formed through one end of the retention tube 10. The plate-locking hole 32 and the tube-locking hole 34 are sized to receive a bolt 110 of a padlock 108.

The locking storage system for fishing rods 1 lockably retains at least one fishing rod 100 in a locked position. The reel 104 cannot be removed from the rod 101, because a threaded ring is retained inside the rod collar 14. The fishing rods 100 cannot be removed from the locking storage system for fishing rods 1 without damaging the fishing rods or destroying the retention base 10 or the sliding lock plate 12. Mounting holes 36 are formed through a backside of the retention base 10 to receive some type of fastener. The retention base 10 is preferably mounted to a flat surface, such as a wall. When the retention base 10 is mounted to a flat surface and at least one fishing rod 100 is inserted in at least one rod collar 14, fasteners in mounting holes 36 become inaccessible, thereby preventing removal of retention base 10 from the mounting surface.

Figure 1:
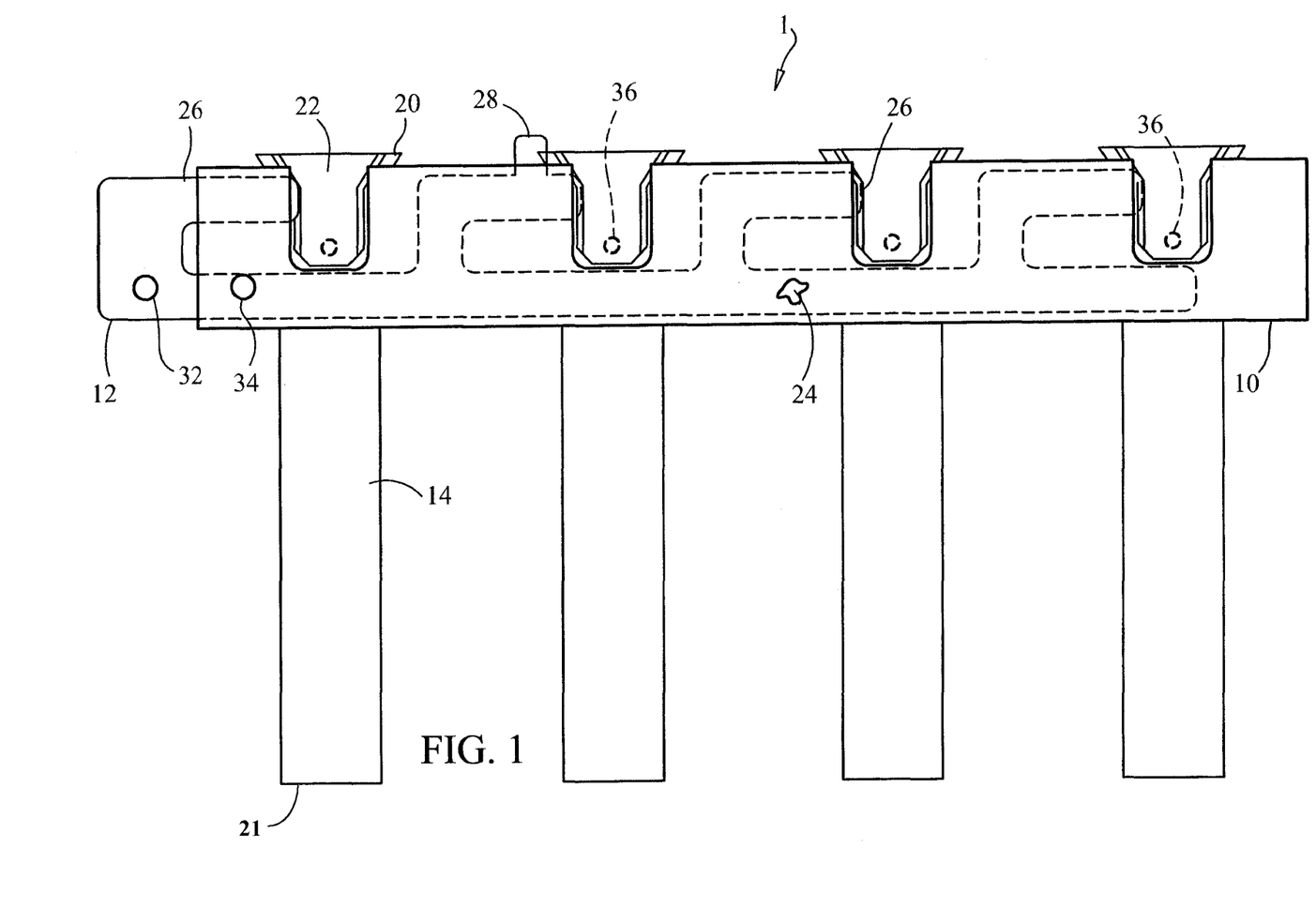
FIG. 1 is a front view of a locking storage system for fishing rods in an unlocked position.
Figure 2:
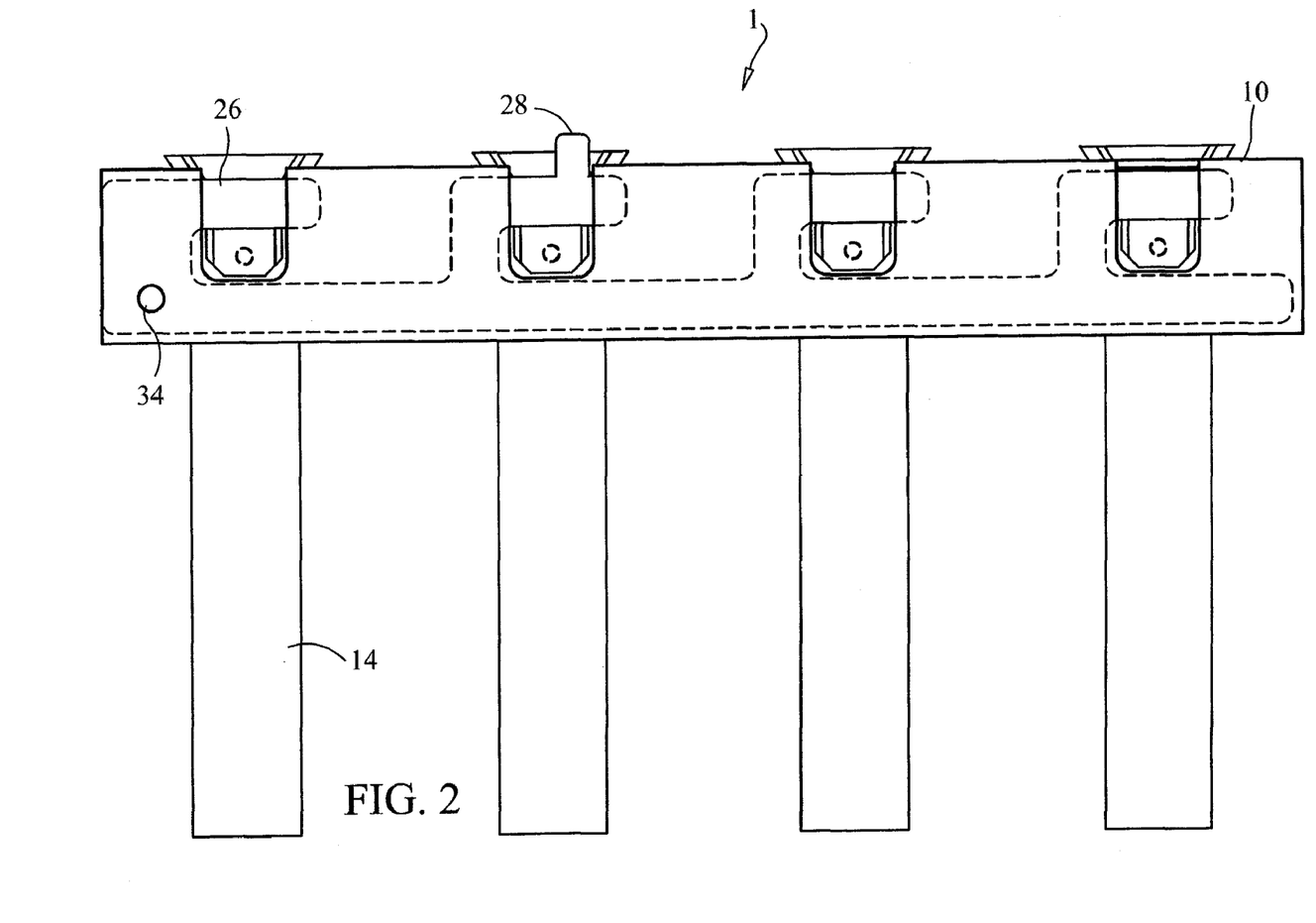
FIG. 2 is a front view of a locking storage system for fishing rods in a locked position.
Figure 3:
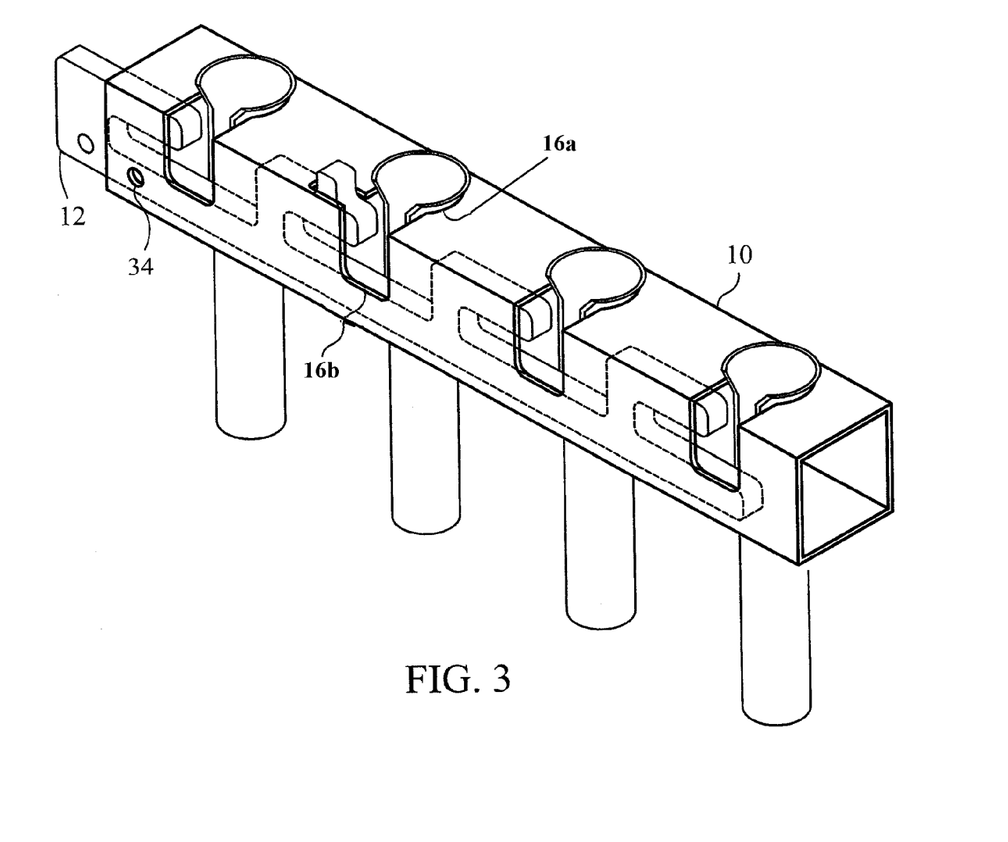
FIG. 3 is a perspective view of a locking storage system for fishing rods in an unlocked position.
Figure 4:
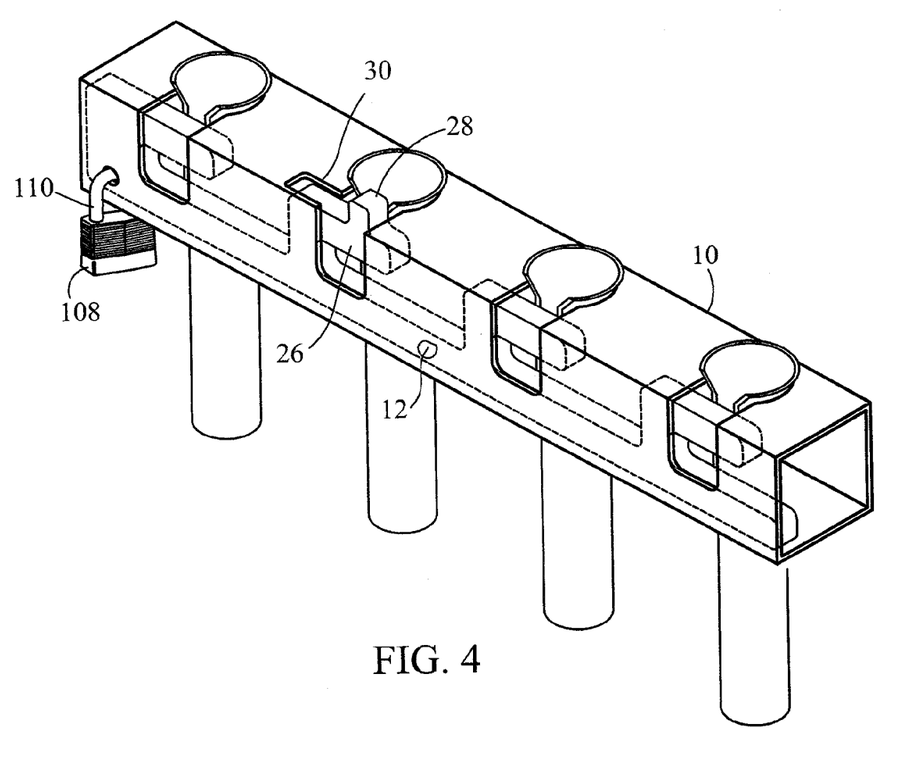
FIG. 4 is a perspective view of a locking storage system for fishing rods in a locked position utilizing a padlock.
Figure 5:
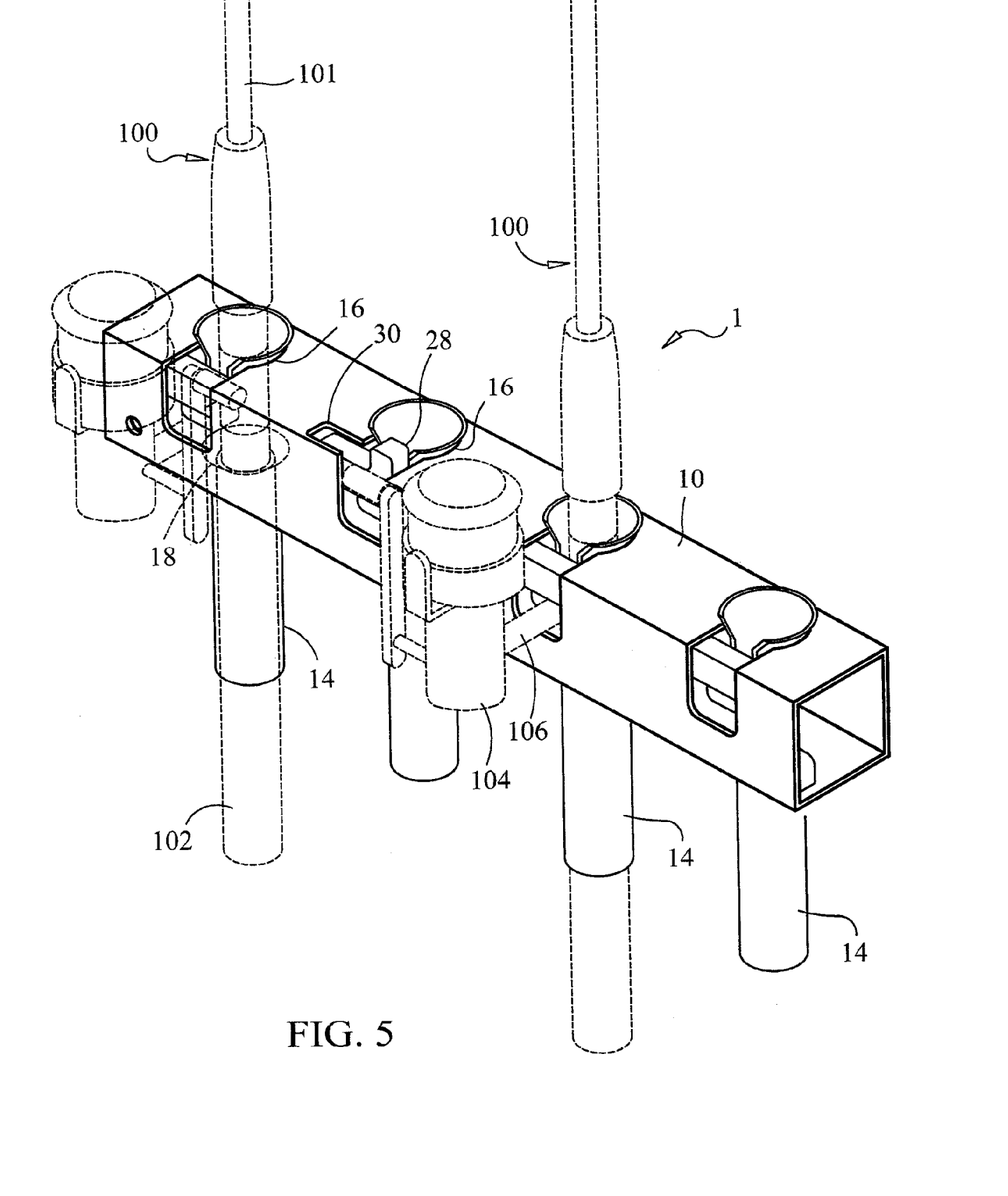
FIG. 5 is a perspective view of a locking storage system for fishing rods in a locked position with two fishing rods retained therein.
Figure 6:
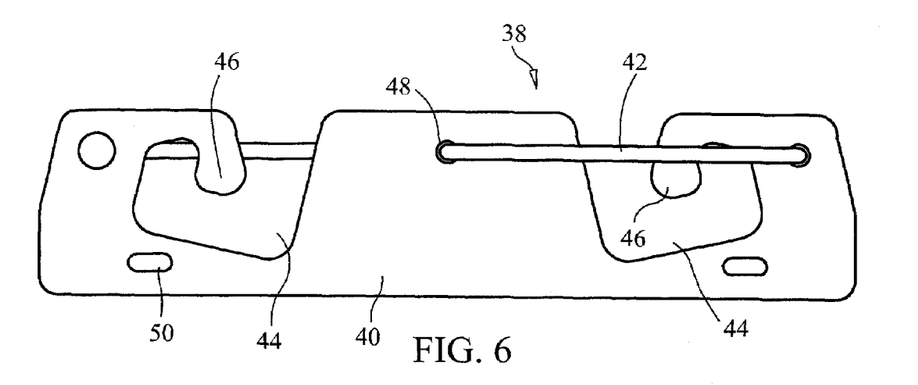
FIG. 6 is a front view of a rod retention plate of a locking storage system for fishing rods.
Figure 7:
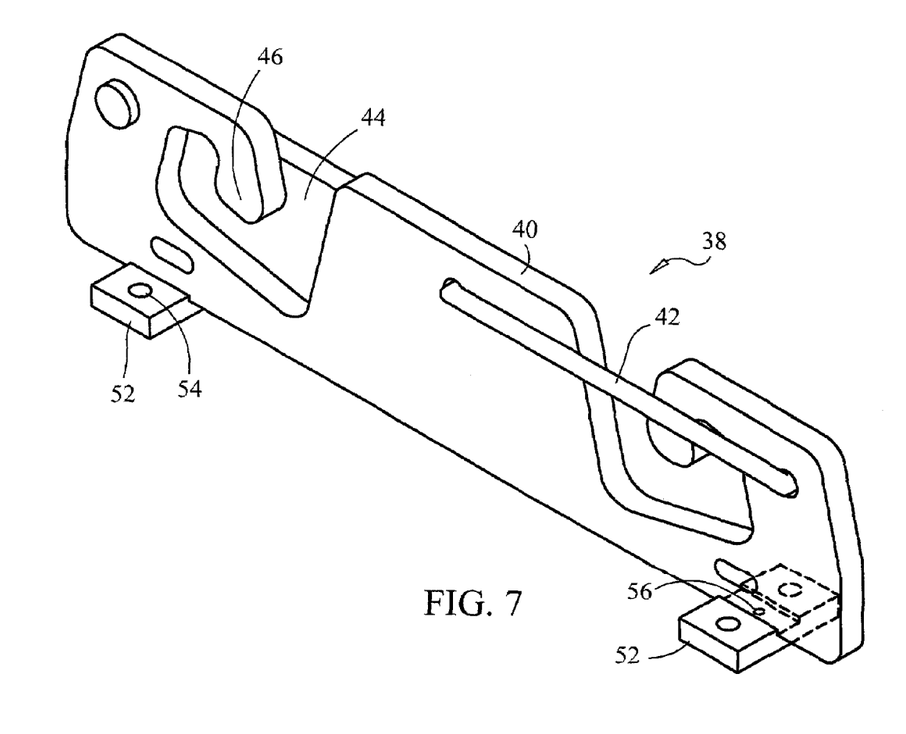
FIG. 7 is a perspective view of a rod retention plate of a locking storage system for fishing rods.

Referring briefly to FIGS. 6–7, a rod retention plate 38 may be used in conjunction with the locking storage system for fishing rods 1. The rod retention plate 38 preferably includes a retention plate 40 and an elastic cord 42. At least one rod slot 44 is formed in a top of the retention plate 40. A retainer projection 46 extends from one side of each rod slot 44. One end of the elastic cord 42 is secured to one end of the retention plate 42 and the other end of the elastic cord 42 is secured to the other end of the retention plate 42. A cord hole 48 is preferably formed through a middle of the retention plate 42 to receive the elastic cord 42.

Figure 8:
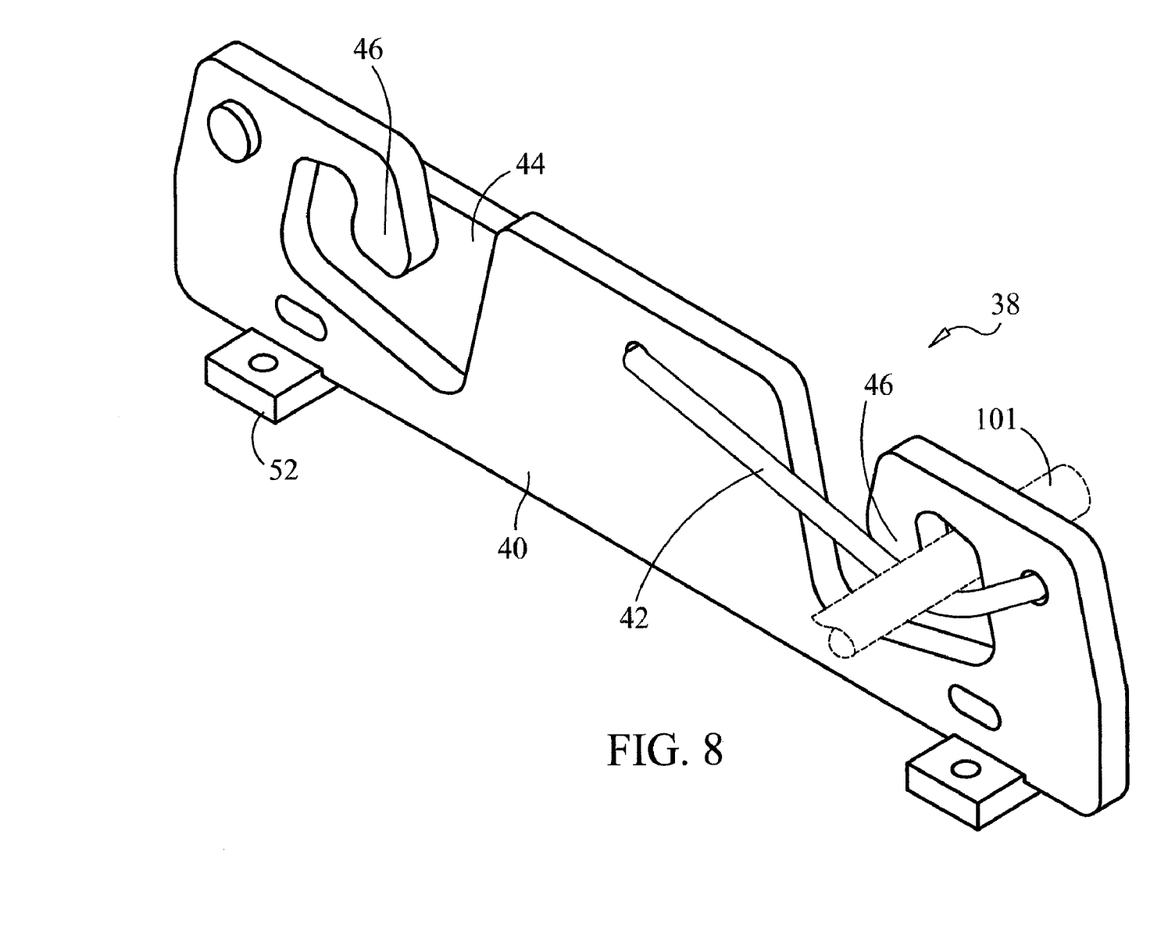
FIG. 8 is a perspective view of a rod retention plate of a locking storage system for fishing rods retaining a fishing rod.

A mounting slot 50 may be formed through each end of the retention plate 40 for mounting to some object. A mounting foot 52 may be secured to each end of the retention plate 40. The mounting feet 52 are used to attach the retention plate 40 to a flat surface such as a wall. At least one mounting hole 54 is formed through the mounting foot 52. A foot-mounting hole 56 is formed through the mounting foot 52 to receive a fastener (not shown). The fastener is inserted through the foot-mounting hole 56 and screwed into a bottom of the retention plate 40. With reference to FIG. 8, an end of the rod 101 of a fishing rod 100 is retained between the retainer projection 46 and the elastic cord 42.

Figure 9:
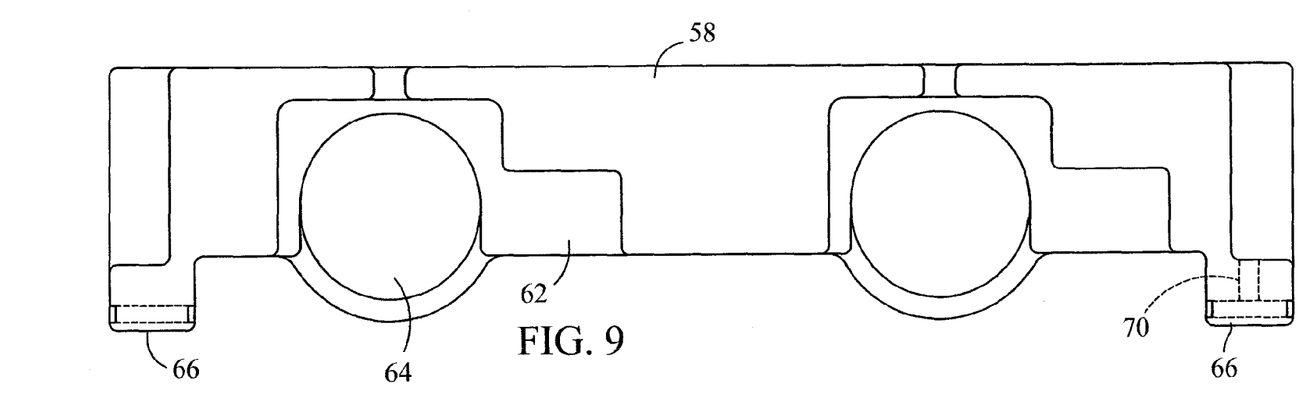
FIG. 9 is a top view of a contoured rod base of a second embodiment of a locking storage system for fishing rods with the lock plate removed.
Figure 10:
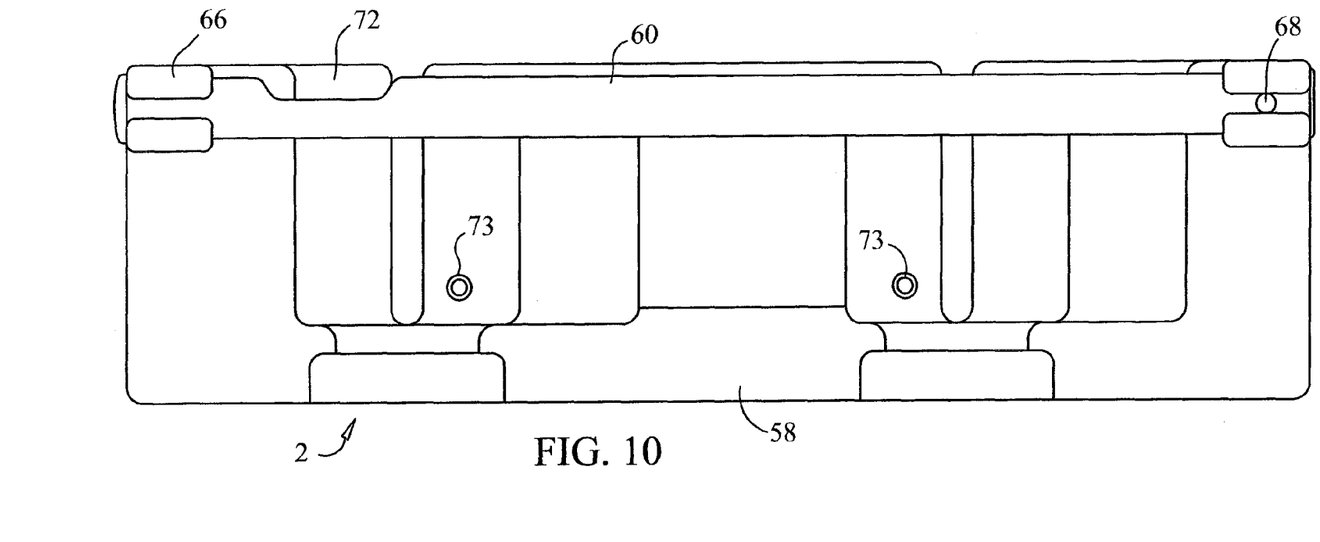
FIG. 10 is a front view of a second embodiment of a locking storage system for fishing rods with the lock plate in a locked position
Figure 11:
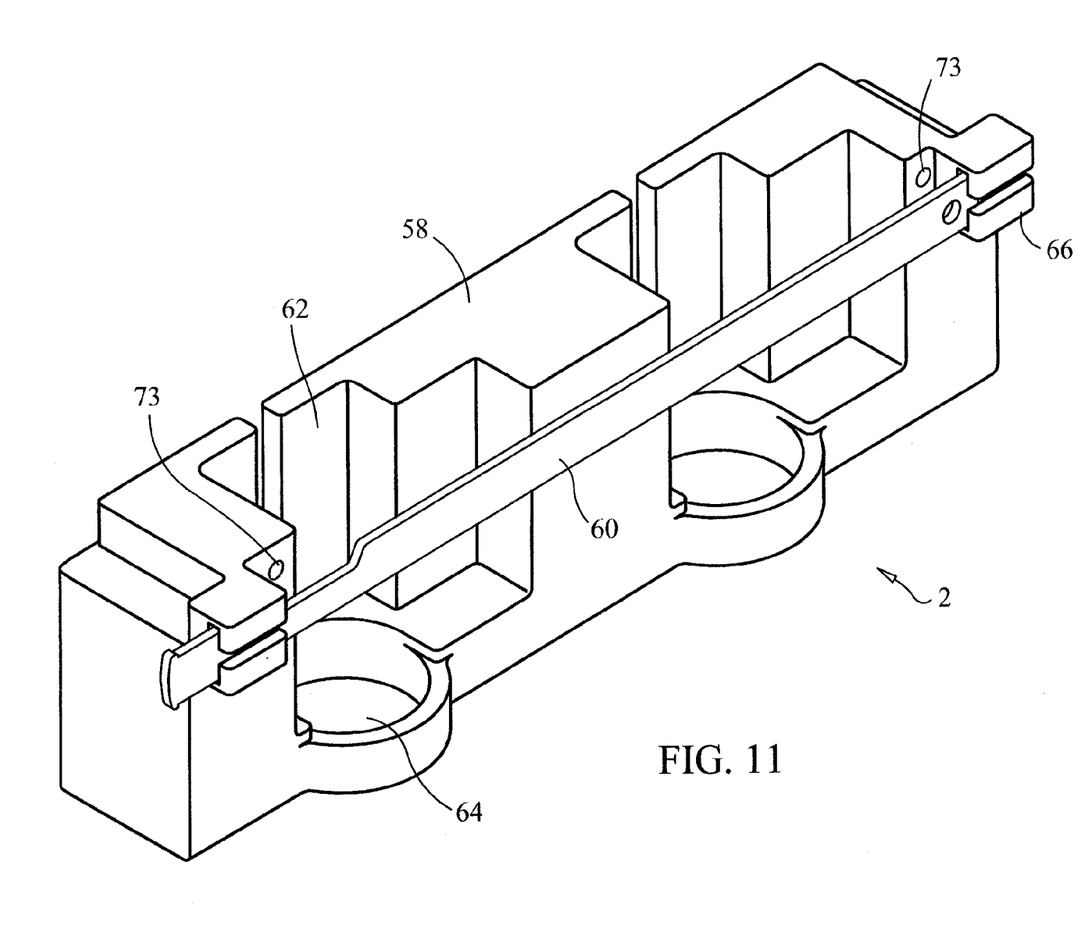
FIG. 11 is a perspective view of a second embodiment of a locking storage system for fishing rods with the lock plate in a partially engaged position.

Referring briefly to FIGS. 9–11, a second embodiment of locking storage system for fishing rods 2 preferably includes a contoured rod base 58 and a sliding lock plate 60. The contoured rod base 58 preferably includes at least two contoured cavities 62 that are each sized to receive a bait-casting, trolling, or other reel 114. Many reels 114 are configured with a reel clamp which can aid in preventing access to mounting hardware once fishing rods are inserted in place. A rod hole 64 is formed through a bottom of the contoured rod base 58 to receive an end 118 of a rod 116. At least two sliding plate retainers 66 extend from a front of the contoured rod base 58. At least two sliding plate retainers 66 are sized to slidably receive the sliding lock plate 60.

A plate-locking hole 68 is formed through one end of the sliding lock plate 60 and a base lock hole 70 is formed through one end of the contoured rod base 58. The plate-locking hole 68 and the base lock hole 70 are sized to receive the bolt 110 of the padlock 108. A lock plate removal notch 72 is preferably formed in a top of the sliding lock plate 60 to sliding relative to the contoured rod base 58. A lock plate removal notch 72 is preferably formed in one edge of the sliding plate 60. Lock plate removal notch 72 permits pivoting upward removal of lock plate 60 through the sliding plate retainers 66, enabling removal of sliding plate 60 from contoured rod base 58 after only a small displacement of lock plate 60, as opposed to a full distal displacement through sliding plate retainers 66. A plurality of mounting holes 73 are formed through the front of the contoured rod base for mounting to a flat surface, such as a wall.

Figure 12:
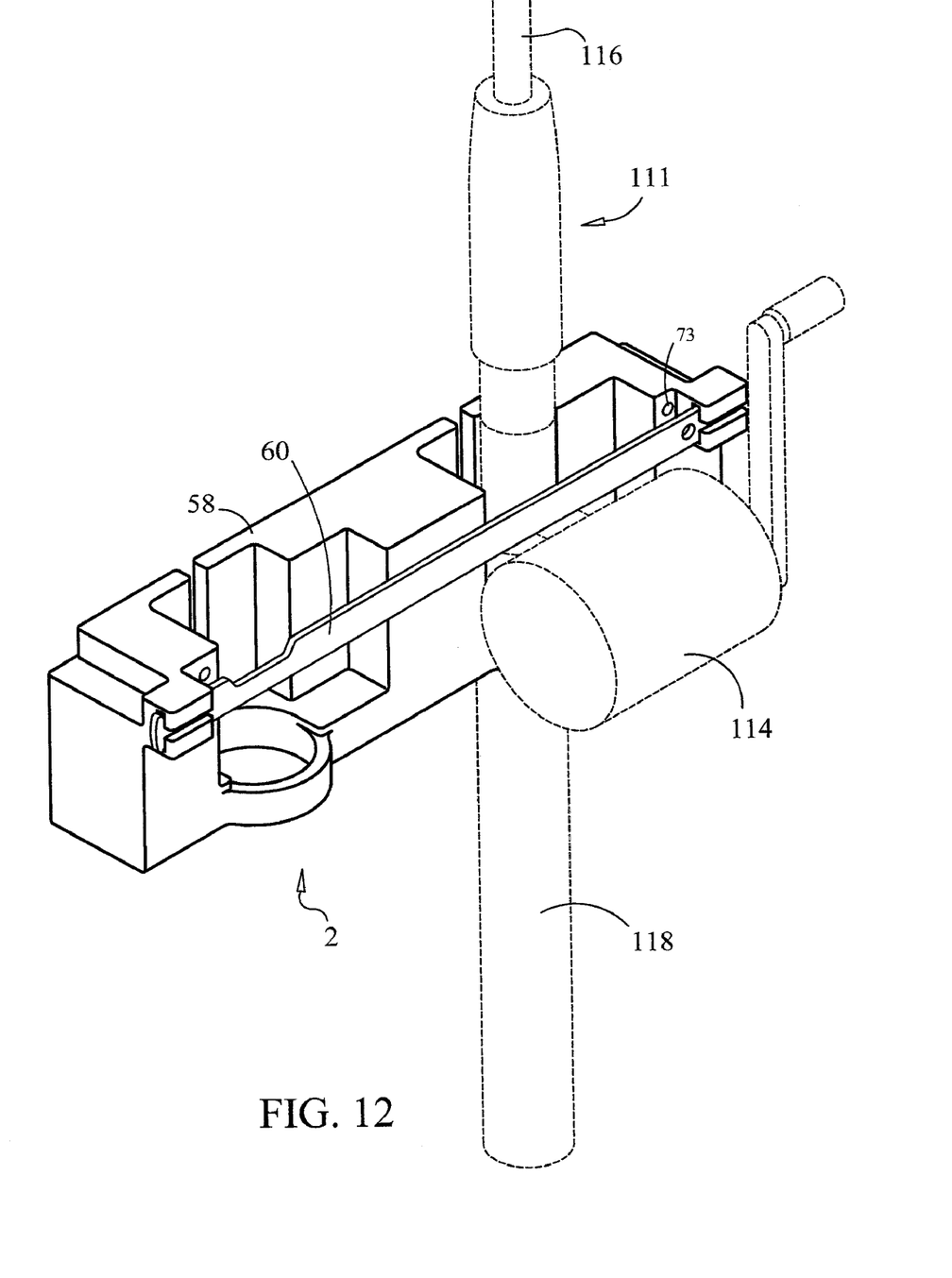
FIG. 12 is a perspective view of a second embodiment of a locking storage system for fishing rods retaining a fishing rod in a locked position.

With reference to FIG. 12, the reel 114 is captured between the sliding lock plate 60 and a bottom of the contoured cavity 62. The locking storage system for fishing rods 2 lockably retains at least one fishing rod 111 in a locked position. The reel 114 cannot be removed from the rod 116, because reel retaining screws are not accessible when the reel 114 is retained in the contoured cavity 62. The fishing rods 111 cannot be removed from the locking storage system for fishing rods 2 without damaging the fishing rods or destroying the contoured rod base 58. It will be appreciated by those skilled in the art to which the present invention pertains that the contoured rod base 58 may not be removed from the mounting surface as the mounting holes 73 are not accessible when the sliding lock plate 60 is in the locked position. The rod retention plate 38, may be used in conjunction with the locking storage system for fishing rods 2.

Figure 13:
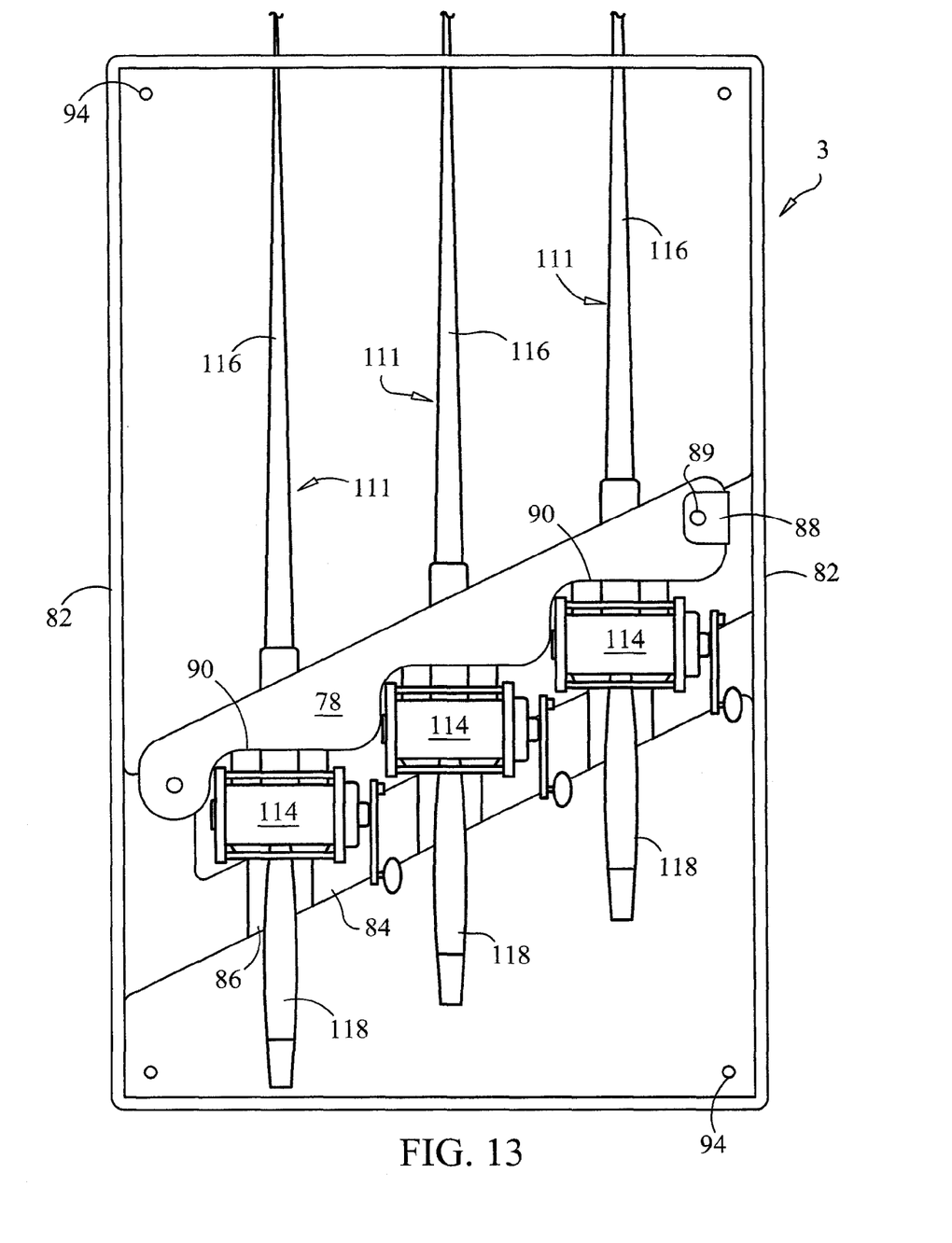
FIG. 13 is a top view of a third embodiment of a locking storage system for fishing rods retaining a plurality of fishing rods in a locked position.
Figure 14:
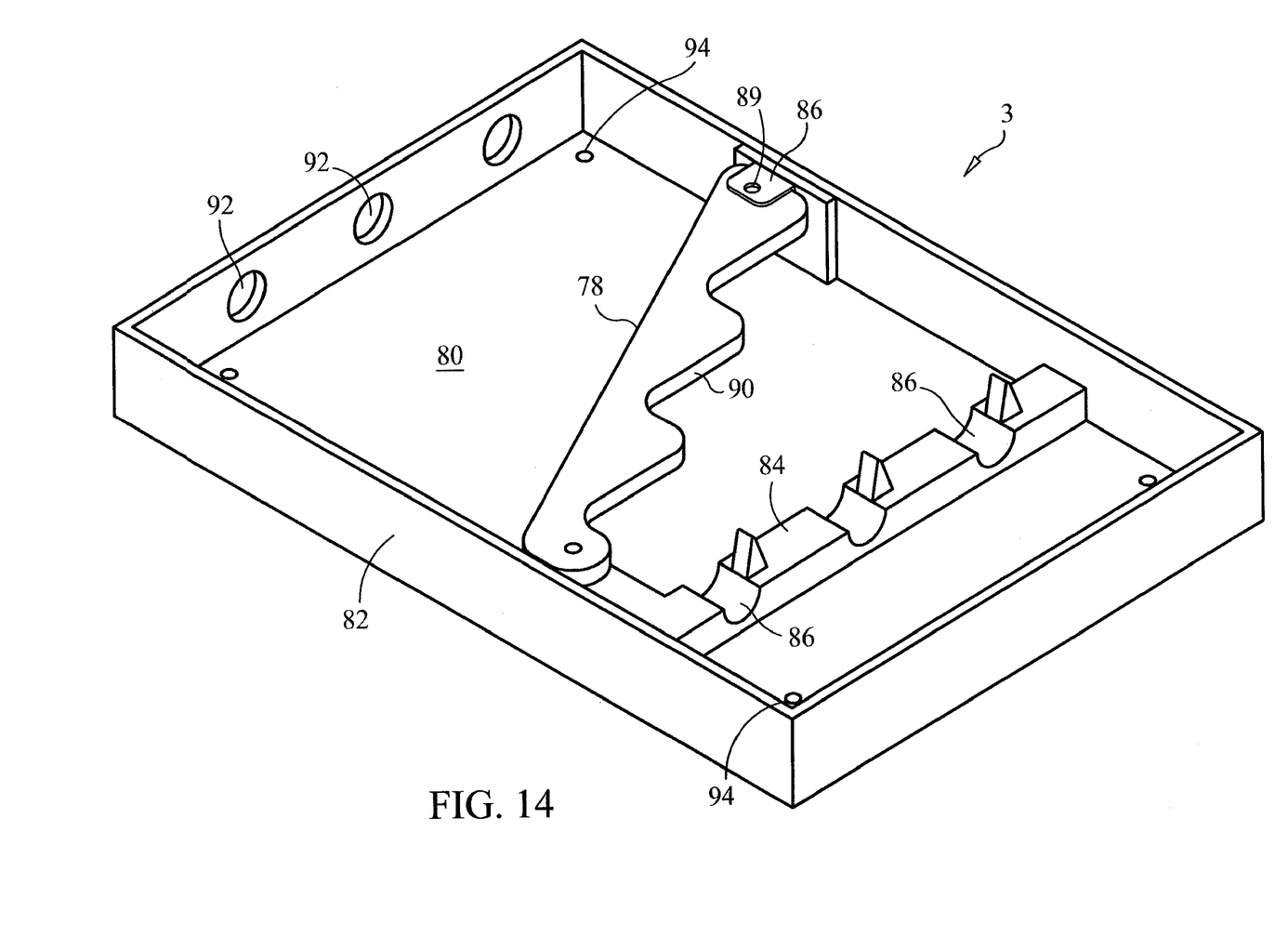
FIG. 14 is a perspective view of a third embodiment of a locking storage system for fishing rods in a locked position.

Referring briefly to FIGS. 13–14, a third embodiment of a locking storage system for fishing rods 3 preferably includes a rod tray 74, a rod support 76 and a swinging lock plate 78. The rod tray 74 includes a base 80 and a peripheral wall 82 extending upward from a perphery of the base 80. A rod support 84 extends upward from the base 80. At least two rod cavities 86 are formed in a top of the rod support 84 to receive the rods 116 of at least two fishing rods 111. One end of the swinging lock plate 78 is pivotally attached to the rod support 84. The other end of the swinging lock plate 78 is captured by a lock plate 88 extending from the peripheral wall 82. A lock hole 89 is formed through the other end of the swinging lock plate 78 and the lock plate 88 to receive a bolt of a padlock (not shown).

At least two parallel slots 90 are preferably formed in one side of the swinging lock plate 78. At least two rod holes 92 are formed through the peripheral wall 82 to receive at least two fishing rods 116. To lock fishing rods 111 in the locking storage system for fishing rods 3, the swinging lock plate 78 is swung against the peripheral wall 82. The rods 116 are inserted through the rod holes 92. The fishing rods 111 are positioned, such that the end 118 of the rods 116 are in the rod cavities 86 and the reels 114 are between a front of the rod support 84 and the parallel slots 90. The bolt of the padlock is inserted through the lock hole 89 in the lock plate 88 and the other end of the swinging lock plate 78 to lockably retain the fishing rods 111. The reel 114 cannot be removed from the rod 116, because reel retaining screws are not accessible when the reel 114 is retained between the swinging lock plate 78 and the rod support 84. The locking storage system for fishing rods 3 may be mounted to a flat surface by inserting fasteners through mounting holes 94 formed through the base 80 or glued, screwed or otherwise fastened into an appropriately-sized rectangular hole in a flat surface, such as, for example, the inner liner of a vessel.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A locking storage system for securing fishing rods having reels attached via a reel pedestal, comprising:

a retention base having a plurality of openings formed therethrough, the retention base having at least a side wall and a top wall which intersect each other, each of the plurality of openings comprising a horizontally extending portion extending through the top wall and a vertically extending portion extending through the side wall, the horizontally and vertically extending portions intersect each other along the same area where the side and top walls intersect;

a plurality of rod collars having top ends which are flared and bottom ends, the plurality of rod collars being inserted into the horizontally extending portions of the plurality of openings such that portions of the flared top ends rest on the top wall and the bottom ends extend below the retention base, an inner perimeter of each one of the plurality of rod collars being sized to receive a rod of a fishing rod, each of the rod collars further having a reel clearance slot formed therein extending from the flared top end toward the bottom end and terminating at a location above the bottom end, the reel clearance slot both communicating in a horizontal direction with and being aligned with a respective vertically extending portion of the plurality of openings, each of the rod collars being sized such that when the rod is inserted into the rod collar, the reel pedestal which secures the reel to the fishing rod slidably fits into the reel clearance slot;

a sliding lock plate having a plurality of locking projections which extend in a direction transverse to the vertically extending portions and the reel clearance slots, the sliding lock plate being slidably retained between an inside perimeter of the side wall of the retention base and the plurality of rod collars, the sliding lock plate being slidably movable between an unlocked position and a locked position, wherein in the unlocked position at least one of the plurality of locking projections is positioned only on one side of a respective one of the vertically extending portions and a respective one of the reel clearance slots to allow communication between the respective one of the vertically extending portions and the respective one of the reel clearance slots in the horizontal direction, and wherein in the locked position the at least one of the plurality of locking projections extends from the one side across to the other side of the respective one of the vertically extending portions and the respective one of the reel clearance slots such that communication between the respective one of the vertically extending portions and the respective one of the reel clearance slots is thereby blocked in the horizontal direction, the sliding lock plate being engaged with the retention base such that when a fishing rod with attached reel is inserted into the locking storage system, the at least one of the plurality of locking projections encloses the fishing rod and the attached reel pedestal such that the reel cannot be disconnected from the fishing rod, and the fishing rod is prevented from being withdrawn from the rod collar.

2. A system, as in claim 1, further comprising:

a rod retention plate further comprising a retention plate and an elastic cord, the retention plate having at least two rod slots; and a retainer projection extending within each of the rod slots, the elastic cord extends across each of the rod slots.

3. A system, as in claim 1, wherein:

the retention base is fabricated from a square tube.

4. A system, as in claim 1, further comprising:

the sliding lock plate being secured to the retention base by inserting a padlock through the sliding lock plate and the retention base.

5. A system, as in claim 1, further comprising:

mounting holes formed through the retention base for mounting to a surface.

* * * * *